United States Patent [19]

Deutsch et al.

[11] Patent Number: 4,727,472
[45] Date of Patent: Feb. 23, 1988

[54] SERVO CONTROL SYSTEM FOR TRANSMISSION SHAFT SPEED CONTROL

[75] Inventors: Robert W. Deutsch, Sugar Grove, Ill.; Stephen A. Edelen, Battle Creek, Mich.

[73] Assignees: Motorola, Inc., Schaumburg, Ill.; Eaton Corporation, Cleveland, Ohio

[21] Appl. No.: 846,185

[22] Filed: Mar. 31, 1986

[51] Int. Cl.$^4$ .................... F16H 3/00; B60K 20/00
[52] U.S. Cl. .................... 364/183; 74/861; 74/866; 364/161
[58] Field of Search .................... 364/183, 424.1, 161, 364/162; 74/861, 866–869; 318/609, 610

[56] References Cited

U.S. PATENT DOCUMENTS

| | | | |
|---|---|---|---|
| 4,495,837 | 1/1985 | Morschezk | 74/867 |
| 4,495,839 | 1/1985 | Morschezk | 74/869 |
| 4,498,036 | 2/1985 | Salemka | 364/183 |
| 4,543,637 | 9/1985 | Smith et al. | 364/500 |
| 4,555,959 | 12/1985 | Braun | 74/334 |

Primary Examiner—Jerry Smith
Assistant Examiner—Allen MacDonald
Attorney, Agent, or Firm—Phillip H. Melamed

[57] ABSTRACT

A vehicle electronic transmission control system (10) having a servo control loop is disclosed. During the selection of a new gear, a countershaft (27) and transmission input drive shaft (13) are declutched from an engine crankshaft (11) and decoupled from a transmission output shaft (15). An error signal e is calculated representative of the difference between a desired speed related to input shaft speed ($w_1$) and actual output shaft speed ($w_2$). The error signal e is utilized to provide a servo control signal C having a first proportional term related to the square of the error signal, but having the polarity of the error signal, a second term related to the integral of the error signal multiplied by the absolute magnitude of the error signal and a third term related to the derivative of the error signal. The signal C determines a pulse width modulation drive signal for either a speed-up slip clutch mechanism (61) or a brake slip clutch mechanism (71) which together control the speed of the countershaft (27) to bring this shaft into proper synchronous relationship with respect to the transmission output shaft (15). When this synchronous relationship is achieved, by virtue of the error signal e being approximately zero, a blocking solenoid (22) is released to permit manual selection of the newly desired gear relationship between the input and output transmission shafts. Subsequently, a master clutch (14) is released which couples the engine crankshaft to the vehicle axle shaft via the present transmission system. By utilizing the absolute magnitude of the error signal as a multiplier M for the proportional and integral terms of the control signal C, a rapid transient response is obtained for synchronizing the input and output transmission shafts and overshoot is minimized.

13 Claims, 3 Drawing Figures

SERVO CONTROL SYSTEM FOR TRANSMISSION SHAFT SPEED CONTROL

BACKGROUND OF THE INVENTION

The present invention is related to servo control systems, and more particularly to such systems useable in electronic transmission shaft speed control systems.

In electronic transmission control systems, particularly systems designated as synchronized transmission systems, such as U.S. Pat. No. 4,329,885, for example, it is known that implementing a specific gear coupling between a drive shaft and a driven shaft is best accomplished when these shafts are being synchronously rotated at the predetermined angular speeds of rotation which are to be implemented by the selective gear to be coupled therebetween. In other words, prior to implementing a gear driving coupling between a drive shaft and a driven shaft, control is implemented such that the shafts are already rotating at the desired relationship between the shafts prior to implementing the gear coupling therebetween. Such systems are sometimes referred to as synchronized transmission systems, and examples of such systems and the components thereof are illustrated in U.S. Pat. Nos. 3,478,851, 4,430,911, 4,495,837, 4,495,839 and 4,329,855, the disclosures of which are incorporated by reference.

In prior electronic transmission control systems, it has typically been a problem in rapidly having the drive and driven shafts obtain the desired speed relationship therebetween which is necessary prior to the implementation of the desired gear coupling between the two shafts. Typically either a slow rise time for controlling the increase of one of the shafts, a slow fall time for decreasing the angular speed of one of the shafts, or a substantial overshoot in obtaining the desired end steady state speed of one of the shafts was encountered. While various techniques were proposed to speed-up the transient response of the entire system while minimizing the amount of overshoot in shaft speed control, the proposed solutions were either complex, costly or did not provide a sufficiently rapid transient response.

SUMMARY OF THE INVENTION

An object of the present invention is to provide an improved servo control system which is useable for controlling shaft speed in an electronic transmission control system.

Another object of the present invention is to provide an electronic transmission control system utilizing an improved servo control system for shaft speed control.

In one embodiment of the present invention an electronic transmission control system is provided. The transmission control system comprises: input drive shaft means for providing an input drive shaft driven at an angular speed $w_1$; output shaft means comprising an output shaft capable of being selectively driven by said input drive shaft means at an angular speed of $w_2$; electronic transmission means selectively coupling said input drive shaft to said output shaft in accordance with a plurality of predetermined selectable angular speed ratios between said speeds of $w_2$ and $w_1$; said electronic transmission means including transmission control means for monitoring said input drive shaft speed $w_1$ and said output shaft speed $w_2$ and controlling at least one thereof, said control means implementing one of said selectable speed ratios by providing a predetermined coupling between said input drive shaft and said output shaft in response to the monitored angular speeds of said shafts having a predetermined relationship therebetween; said transmission control means including a servo control loop including subtraction means for receiving electrical signals related to said input drive shaft speed $w_1$ and said output shaft speed $w_2$, providing an error difference signal e in response thereto and developing at least one control signal in response to said error signal e for controlling the speed of said one of said shafts so as to minimize said error signal e; said transmission control means including means for providing at least a first term of said control signal proportional to said error signal e multiplied by a multiplier M, wherein M equals the absolute value of $e^x$, with e=said error signal e and x being at least 1.

The present invention also provides an improved servo control system comprising: means for receiving actual sensed and desired signals and providing a difference error signal e in response thereto; control means for developing a control signal determined by said error signal e; and means for implementing control of said actual sensed signal in accordance with said control signal so as to minimize said error signal e; said control means including means for providing at least a first term of said control signal proportional to said error signal e multiplied by a multiplier M, wherein M equals the absolute value of $e^x$, with e=said error signal e and x being at least 1.

The above recited embodiments of the present invention preferably implement improved servo control by developing a first term of the servo control signal which is proportional to the square of the error signal e while having the same polarity as the error signal e. This effectively results in providing a larger control signal for substantial error signals while providing less of a control signal magnitude for smaller error signals wherein the variation in the control signal magnitude is nonlinear and is made greater than the normal variation which would exist if the control signal were just directly proportional to the magnitude of the error signal e. It has been found that this relationship greatly speeds up the transient response of a servo control system while also minimizing the amount of overshoot implemented in the control system since as the error decreases to zero the control signal more rapidly decreases thus tending to minimize overshoot.

A feature of the present invention involves the technique of advantageously developing the first term of the control signal by calculating the absolute value of the error signal e and utilizing this as the multiplier M of the error signal e to obtain the square of the error signal which has the polarity of the error signal. In addition, the absolute value of the error signal e is also used as a multiplier for a second term of the control signal which varies in accordance with the integral of the error signal. Thus the response of the control signal to the integral of the error signal is also made nonlinear and this again improves the transient response while minimizing the servo control overshoot response. It should be noted that for microprocessor implementation of the present invention, calculating the absolute value of the error signal is readily accomplished and storage of the absolute value signal can be advantageously utilized to provide both the first and second terms of the control signal. In addition, when the servo control system of the present invention is utilized for implementing electronic transmission control, various clutch mechanisms are utilized to allow implementing control of the speed $w_1$ of the input shaft so as to synchronize the input shaft speed $w_1$ with the output drive shaft speed $w_2$ prior to implementing a gear driving coupling between these two shafts. These features of the present invention, as well as others, can best be understood by reference to the following description of the present invention.

BRIEF DESCRIPTION OF THE DRAWINGS

For a more complete understanding of the present invention, reference should be made to drawings in which.

DESCRIPTION OF THE PREFERRED EMBODIMENTS

Figure 1:
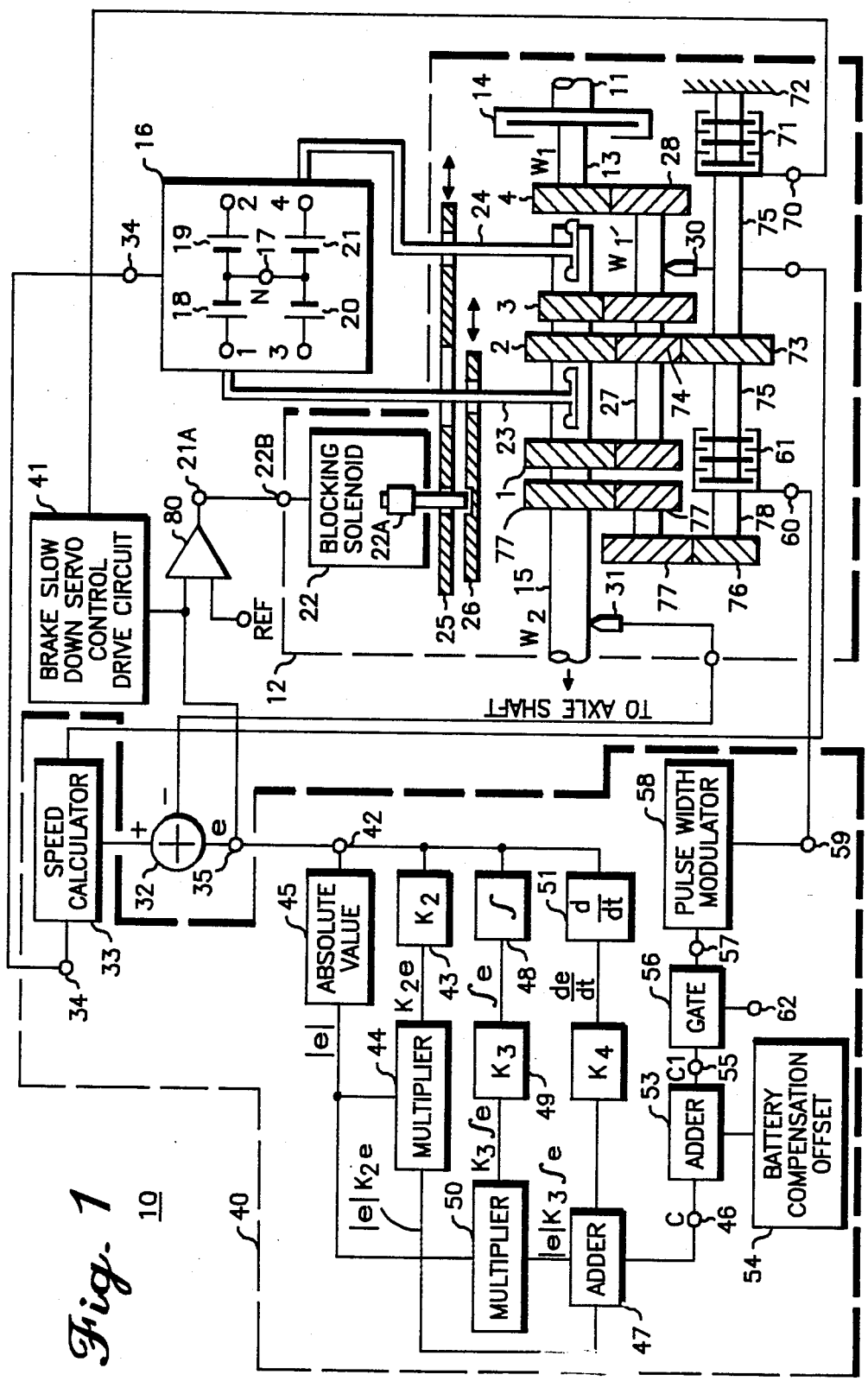
FIG. 1 is a schematic and block diagram of an electronic transmission control system which includes a servo control loop.

Referring to FIG. 1, an electronic transmission control system 10 is illustrated and is intended for operation in conjunction with a vehicle engine. The system 10 is utilized to provide selective gearing between an engine crankshaft 11 and a vehicle axle shaft (not shown) by virtue of mechanical couplings implemented in a transmission control box 12 (shown dashed in FIG. 1). In the present case a transmission input drive shaft 13 is coupled to the engine crankshaft 11 by a conventional masterclutch 14, comprising either a friction clutch and/or a fluid coupling, which is responsive to the vehicle clutch pedal. A transmission output shaft 15 is drivingly coupled to a vehicle axle shaft by a differential and/or a transfer case (not shown). Essentially the transmission control box 12 is responsive to a manual shift control apparatus 16, shown schematically in FIG. 1, which includes a manual gear shift lever (knob) 17 selectively movable between a neutral position N and positionable at locations 1-4 corresponding to the selection of transmission gears for first, second, third or fourth gear. The shift control apparatus 16 and transmission control box 12 select and implement desired gear ratios between the transmission input drive shaft 13 and the transmission output shaft 15. Such a general transmission apparatus as described above, can comprise the well known twin countershaft, constant mesh type transmission illustrated in U.S. Pat. Nos. 3,105,395, and 3,500,695, the disclosures of which are incorporated by reference herein.

Any movement of the manual shift lever 17 between any of the first through fourth gears (1-4) and the neutral gear, results in closing, at least momentarily, switch contacts associated with transmission switches 18 through 21, respectively, which are illustrated schematically within the manual shift control apparatus 16. Each of the switches 18 through 21 will change its state as the manual shift lever 17 moves from neutral to some other gear, such as third gear, for example. When the manual shift lever 17 has completed its travel the switch which had changed its state during gear switching will have resumed its prior state. It is contemplated that the switching signals provided by the switches 18 through 21 will, in general, control the operation of a blocking solenoid 22 in a manner to be subsequently described. These switching signals comprise gear select signals indicative of what gear is to be selected. A 1st/2nd gear jaw clutch select rail 23 and a 3rd/4th gear jaw clutch select rail 24 extend from the control apparatus 16 to the transmission box 12. Each of the select rails is horizontally moveable in response to appropriate movement of the shift level 17 so as to selectively couple any one of the gears 1-4 shown in FIG. 1 to the transmission output shaft 15. In FIG. 1 the transmission box 12 is shown in neutral such that none of the gears 1-4 is coupled in driving relationship to the output shaft 15. Clutch select rail 23 can selectively couple either gear 1 or 2 to output shaft 15, while select rail 24 can couple either gear 3 or 4 to the output shaft.

The solenoid 22, as shown in FIG. 1, includes an extending projection 22A which can be vertically withdrawn. The solenoid is effectively coupled to each of the select rails 23 and 24 via horizontally moveable linkages 25 and 26. With the configuration shown in FIG. 1, the blocking solenoid 22 and linkages 25 and 26 will prevent any movement of the select rails 23 or 24 from neutral position so as to couple any of the gears 1-4 to the output shaft 15 unless the projection 22A is vertically withdrawn. Thus gear coupling to the shaft 15, from neutral, is inhibited until solenoid actuation, or deactuation, withdraws projection 22A. The solenoid 22 and shift mechanisms 23, 24, 25 and 26 are only schematically illustrated in FIG. 1, since many equivalent mechanisms are known and can be utilized. It should also be noted that European patent publication No. EP127949 illustrates a prior system providing gear select signals similar to those provided by control apparatus 16 and the switches 18-21 in response to movement of a gear shift knob or lever.

It is contemplated that in shifting from third gear to neutral, for example, acuation of the vehicle transmission (clutch) foot pedal (not shown) occurs first and this results in the clutch 14 disengaging the engine crankshaft from the transmission input shaft 13. Then the shift lever 17 is moved from position 3 to the neutral position N and this results in right side movement of select rail 24 to the neutral position illustrated in FIG. 1, thereby decoupling gear 3 from shaft 15. When the manual shift knob 17 is now moved so as to attempt to select a new non neutral gear, one contact of one of the switches 18 through 21 will be closed by movement of the lever 17 indicating the attempted selection of another gear. However, until an appropriate relationship is established between the input transmission shaft 13, rotating at a predetermined angular speed $w_1$, and the output shaft 15 rotating at a speed $w_2$, the blocking solenoid 22 will prevent the select rails 23-24 from coupling any of the first through fourth gears (1, 2, 3, or 4) between the input drive shaft 13 and the output shaft 15. In addition, the solenoid blocks further movement of the lever 17 into one of the position 1-4. In FIG. 1, the first through fourth gears associated with the manual shift lever 15 positions 1-4, representing first through fourth gears, are identified by the reference numerals 1 through 4. Essentially, the blocking solenoid remains energized, preventing coupling a new gearing between the input shaft 13 and the output shaft 15, via the shift mechanisms 23-24, until a signal at a control terminal 22B releases the solenoid. This control signal is provided when desired synchronization is achieved between the shafts 13 and 15.

Essentially, when manually shifting from neutral to another gear, one contact of one of the switches 18 through 21 is closed indicating that a specific gear selection is desired. However, implementation of this gearing is prevented by the blocking solenoid 22 until a single or twin countershaft 27 is being rotated at a predetermined angular speed $w_1'$ which has predetermined relationship with respect to the transmission output shaft speed $w_2$. The countershaft 27 is coupled to the transmission input drive shaft 13 by a fixed gear coupling 28, which includes gear 4, such that the countershaft angular speed $w_1'$ has a fixed predetermined relationship to the input drive shaft speed $w_1$. This therefore means that effectively coupling a gearing between the input shaft 13 and the output shaft 15 is prevented until appropriate synchronous rotation of these shafts has first been achieved. This general type of operation has been achieved in prior electronic transmission control systems, but the prior systems have typically provided too long of a transient time in implementing the proper speed relationship between the countershaft 27 and the output shaft 15 before permitting gear engagement. This is very objectionable to the driver of the vehicle who must wait for synchronism to occur prior to completing the desired gear shifting. The present invention minimizes this transient delay in the following manner.

Since the present invention is concerned with providing effective synchronism between the rotation of the input shaft 13 (the countershaft 27) and the output shaft 15, the angular rotation speeds of the countershaft 27 and transmission output shaft 15 are each sensed by separate speed sensors 30 and 31, respectively. In general, the input shaft 13 is considered to be rotated at an engine speed $w_1$ while the countershaft 27 is rotated at an angular speed $w_1'$ which has a fixed relationship to the speed $w_1$ determined by the coupling 28. The output shaft 15 is normally selectively drivingly rotated at a speed $w_2$ by the input shaft 13 being coupled to shaft 15 by one of the gears 1-4. The relationship between $w_2$ and $w_1$ depends on the gear coupling selectively provided by the gears 1-4.

Each of the sensors 30 and 31 can comprise magnetic sensors sensing the passage of rotating teeth on each of the desired shafts whose speed is desired to be monitored (sensed). In addition, the sensors can include integrating means for developing analog signals related to the shaft speed of the associated shafts. Alternatively, each of the sensors 30 and 31 can just produce periodic pulses, with a computer or microprocessor further processing these pulses to derive the appropriate angular speed information. In any event, the output shaft speed $w_2$ sensed by the sensor 31 is provided as an input to a subtraction apparatus 32 which receives an additional input from a speed calculator circuit 33 that receives one input from the sensor 30 and has an additional input terminal 34 which receives input signals from the manual shift control apparatus 16.

Essentially, when the manual shift lever 17 is moved from neutral to select the implementing of a particular gear, one contact of one of the switches 18 through 21 is closed, and this provides a signal which indicates which gear is to be selected. This gear selection signal caused by the closure of one of the switches is the signal received at the terminal 34 by the speed calculator circuit 33. For each gear to be selected, it is known what type of relationship must exist between the input drive shaft speed $w_1$ and the output shaft speed $w_2$ in order to provide synchronism between the output shaft 15 and countershaft 27 (or input shaft 13) prior to the implementing of the selected gear coupling to be provided therebetween. The function of the speed calculator 33 is to select an appropriate multiplier factor $K_1$ which effectively multiplies the input shaft angular speed $w_1$ (the countershaft speed $w_1'$) by the factor $K_1$ and provides this term as a desired speed input to the subtraction means 32 which receives as its other input the output shaft speed $w_2$. The difference between these two speeds is provided as an error signal e by the subtraction means 32 at an output terminal 35. The error signal e represents the difference between the actual sensed output shaft speed $w_2$ and the desired countershaft speed $K_1 (w_1')$ which is needed for shaft synchronism for the gear coupling to be implemented.

When synchronism is achieved, the magnitude of the error signal e will typically be substantially zero, but initially a substantial magnitude for this signal will exist indicating the nonsynchronization of the input shaft 13, and/or countershaft 27, with respect to the output shaft 15 for the gearing which is to be implemented. The present invention involves the processing of this error signal e so as to effectively control the speed of the countershaft 27 and input shaft 13 so as to rapidly bring them into synchronization with the output shaft 15 to thereby permit the implementation of the proper gearing by the gears 1 through 4. The manner in which the jaw clutch select rails 23 and 24 physically contact the gear members 1 through 4 and the output shaft 15 to implement the desired gear selection is not of particular concern to the present invention, and such mechanisms are well known to those skilled in the art and are illustrated in several of the transmission patents previously referred to. However, a significant feature of the present invention deals with the manner of processing the error signal e by circuitry in a servo control loop so as to obtain improved performance for the transmission system 10.

Essentially, a speed-up control circuit 40 (shown dashed in FIG. 1) receives the error signal e at the terminal 35 as one of its inputs while a brake, or slow down, servo control drive circuit 41 also receives this same signal as an input. Details of the brake servo control circuit 41 are not shown since this circuit is substantially similar to the speed-up control circuit 40, wherein the main difference resides in different multiplication factors being applied to various terms of the control signal produced by the brake circuit 41 as opposed to the control signal provided by speed-up circuit 40. The operation of the speed-up circuit 40 will now be discussed in detail.

The speed-up circuit 40 comprises an input terminal 42 at which the error signal e is provided. This terminal is coupled through a multiplier stage 43 which multiplies the error signal e by a factor $K_2$ and provides an output signal $K_2 (e)$ as an input to a multiplier stage 44. The terminal 42 is also coupled as an input to an absolute value circuit 45 which effectively calculates the absolute value of the magnitude of the signal e and provides this absolute value signal also as an input to the multiplier circuit 44. The output of the absolute value circuit 45 is essentially a multiplier M equal to the absolute value of $e^x$, with e being the error signal e and x being equal to one. The output of the multiplier circuit 44 represents the square of the error signal having the same polarity as the error signal e and multiplied by $K_2$. This signal is a first term of a composite control signal C to be provided at an output terminal 46 by an adder circuit 47 which receives this first signal term. The terminal 42 is also coupled to integrator circuit 48 which provides the integrated output of the signal e to a multiplier circuit 49 which multiplies the integral of signal e by a constant $K_3$. The output of the circuit 49 is provided as an input to a multiplier stage 50 which receives the absolute value signal as one input and provides a second term of the control signal C comprising the product of $K_3$, the integral of the signal e and the absolute value of the signal e. In addition, preferably a derivative circuit 51 and a multiplier circuit 52 having a factor $K_4$ are provided wherein these elements provide an input to the adder 47 comprising a third term of the control signal C equal to the product of $K_4$ and the derivative of the signal e.

The signal C at the terminal 46 is a servo control signal having a first proportional term effectively varying as the square of the signal e, an integral term which is also multiplied by the absolute value of the signal e and a derivative term. The signal C is provided as an input to an adder circuit 53 which receives an additional input from a battery compensating offset circuit 54 such that a composite control signal C1 is provided at an output terminal 55. The signal C1 includes a constant related to battery voltage such that the control signal C1 will take into account differences in battery voltage and compensate for these variations. The control signal C1 is provided as an input to a gate 56 which, when closed, will pass the signal C1 to a terminal 57 that provides a control input to a pulse width modulation circuit 58 that provides an output at a terminal 59 that is coupled to a control terminal 60 of a variable slip clutch 61. A control terminal 62 of the gate 56 controls the opening and closing of the gate wherein the gate 56 will be closed so as to permit the passage of the signal C1 whenever the manual shift control apparatus 16 indicates that a desired shift in gearing is to occur but has not yet been accomplished. This desired shifting can be determined by the closure of one of the contacts of the switches 18 through 21 while another contact of this switch has not yet been closed.

The operation of the brake (slow down) servo control drive circuit 41 is essentially similar to that of the speed-up drive circuit 40 wherein the output of the circuit 41 is provided to a control terminal 70 of a brake slip clutch 71 coupled between a fixed chassis 72 (serving as a brake) and a shaft 75 coupled by gears 73 and 74 to countershaft 27. In a similar manner, the slip clutch 61 provides a controlled variable speed coupling between a gear 76, coupled through a fixed speed-up gearing 77 to the output shaft 15, and its shaft 78 to the gear 73 coupled to the countershaft 27.

Figure 2A:
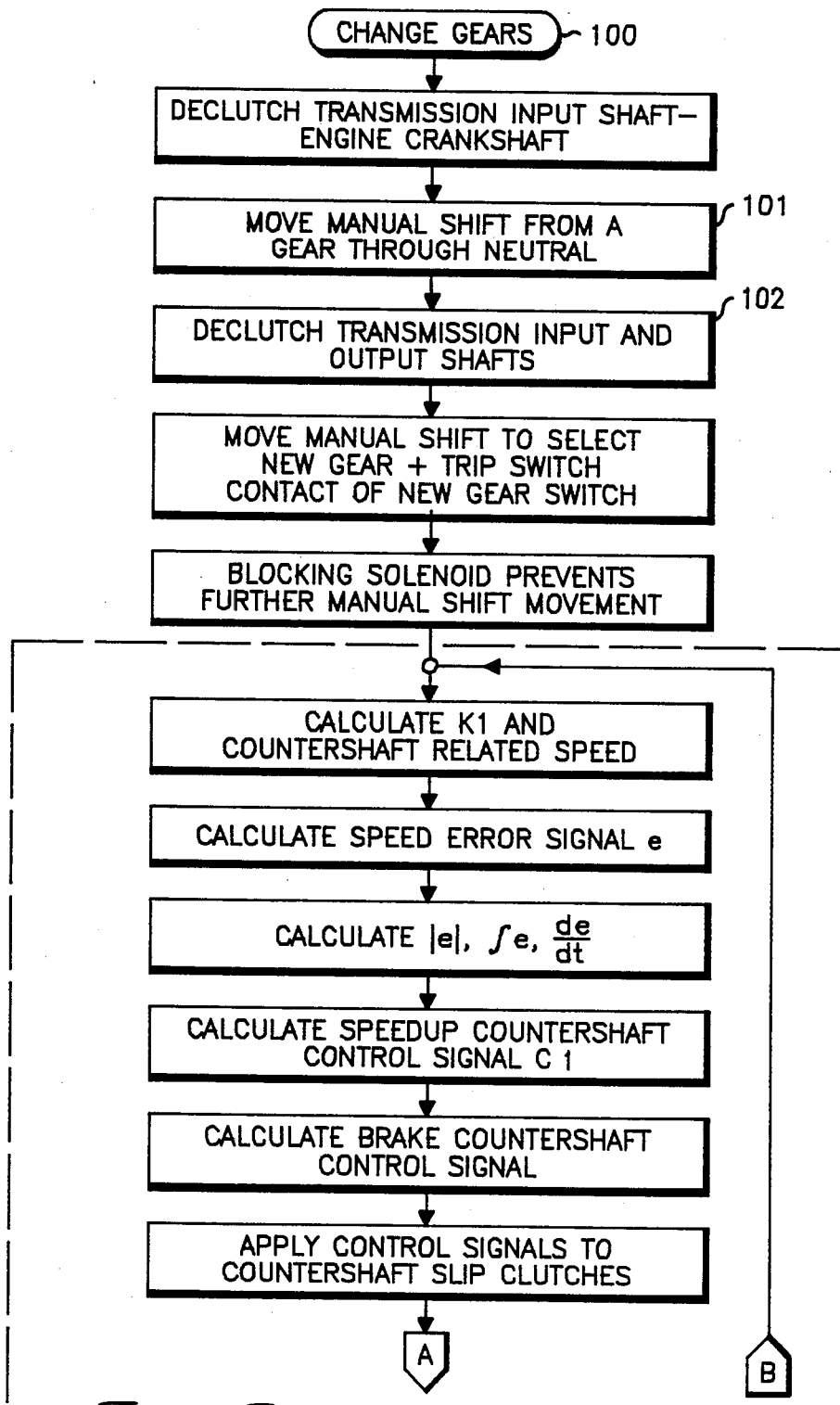
FIGS. 2a and 2b comprises a flow chart representing the preferred transmission control steps implemented by the transmission control system illustrated in FIG. 1.
Figure 2B:
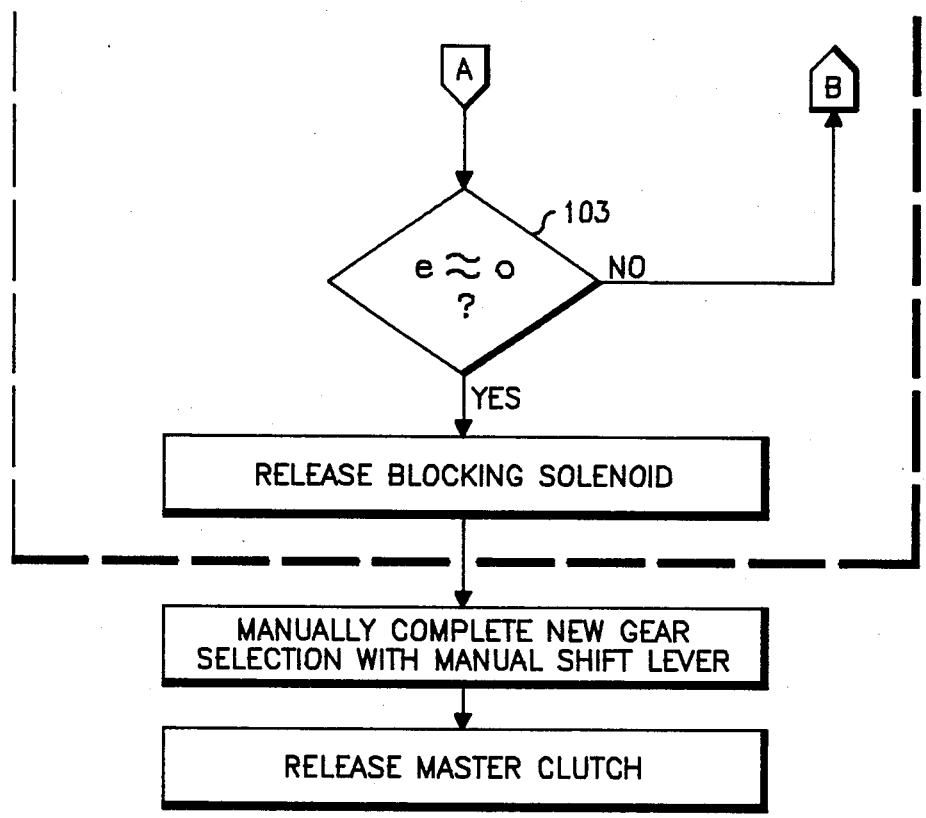

The operation of the electronic transmission control system 10 shown in FIG. 1 can best be described by reference to the flow chart shown in FIGS. 2a and 2b which depicts the major process steps which occur during the selection of a different transmission gear. Essentially the flow chart in FIGS. 2a and 2b is entered at an initial point 100 designating that a change in gears is to be implemented. The determination of a desired change in gears is represented by a process block 101 corresponding to the passing of the manual shift lever 17 from a previously selected gear through neutral. Prior to this step the engine crankshaft and transmission input shaft 13 are declutched via the master clutch 14. As part of the step 101, but illustrated as a subsequent process step 102, the transmission input shaft 13 is decoupled from the transmission output shaft 15 due to movement of the gear select lever 17 to neutral. This occurs, for example, by axial (horizontal) movement of the gear select rails 23 or 24. It is contemplated that while in neutral the vehicle axle shaft and output shaft 15 will now rotate due to vehicle inertia. The gearing 77 between the output shaft 15 and the shaft 78 coupled to the slip clutch 61 will effectively provide an angular speed multiplication such that, by appropriate pulse width modulation actuation of the slip clutch 61, a high angular speed can be coupled to the countershaft 27 via the gears 73 and 74 in case it is necessary to increase the speed of the countershaft 27 to achieve appropriate synchronization. Similarly, if it is necessary to reduce the speed of the countershaft 27, appropriate actuation of the brake slip clutch 71 by virtue of the signal at the control terminal 70 can accomplish this via the gears 73 and 74. During this time, actuation of the clutch 14 assures free inertia rotation of the shafts 13 and 27 except for the action of the slip clutches 61 and 71.

The amount of actuation of either of the slip clutches 61 or 71 is determined by the pulse width modulation signals provided by the speed-up drive circuit 40 or the brake drive circuit 41, and this is determined by the magnitude of the signal e. The magnitude of the error signal e is determined by noting what new gear is to be implemented, wherein the selection of the new gear occurs by the manual shift lever 17 closing one of the contracts of the switches 18 through 21 due to the manual movement of this lever from neutral. As the lever 17 closes one of the contacts of the switches 18 through 21, the blocking solenoid 21 prevents further movement of the lever 17 into one of the final positions 1-4 until synchronization of the countershaft 27 and output shaft 15 is obtained. This blocking solenoid, via linkages 25 and 26, essentially prevents the manual lever 17 from manually moving the gear select rails 23 or 24 horizontally to engage a new desired gear. The closure of one contact of the switches 18 through 21, which occurs when the selection of a new non neutral gear is attempted, essentially enables the gate 56 to pass the control signal $C_1$ as an input to the pulse width modulator 58 which then provides an appropriate drive signal to the slip clutch 61 if an increase in countershaft speed is required. If a decrease in countershaft speed is required, then the polarity of the signal $C_1$ will not result in actuating the slip clutch 61, but the brake (slow down) circuit 41 will activate the brake slip clutch 71. Prior to the closing of the gate 56, the output of the pulse width modulator is such that the slip clutch 61 provides no driving coupling between the shafts 78 and 75.

After the blocking solenoid prevents further manual shifting, the flow chart in FIGS. 2a and 2b enters a synchronization process, shown dashed as comprising a number of individual process steps.

The circuits 40 and 41 calculate a countershaft related speed by virtue of the speed calculator circuit 33 determining the multiplication factor $K_1$ and the sensing of the countershaft speed $w_1'$ by the sensor 30. Then the subtraction circuit 32 essentially calculates the speed error signal e and the circuits 45, 48 and 51 calculate the absolute value, the integral and the derivative of the error signal e. Then various multiplier circuits and adder circuits compute the control signal C having a first term equal to the product of $K_2$, e and the absolute value of e, a second term equal to the product of $K_3$, the absolute value of e and the integral of e and a third term equal to the product of $K_4$ and the derivative of e. The signal C is then utilized to calculate C1 and the circuits 56 and 58 provide the appropriate pulse width modulation signal at the terminal 59 which is then applied to actuate the speed-up slip clutch 61, or a comparable signal is provided and applied to actuate the brake slip clutch 71. This process continues until the error signal e is approximately zero wherein this is essentially represented by a decision block 103 in the flow chart shown in FIG. 2. When an error signal of approximately zero is obtained, a comparator 80 in FIG. 1, which receives the signal e, will produce an appropriate logic output signal at the control terminal 22B which is coupled to the blocking solenoid 22. This signal at the terminal 22B will effectively remove the blocking of the axial (horizontal) movement of the gear select rails 23 and 24 and allow the manual shift lever 17 to complete the selection of a new gear by providing the desired gear coupling between the transmission output shaft 15 and the countershaft 27 and/or input shaft 13. Of course, this is permitted at this time since the magnitude of the signal e is now approximately zero indicating the appropriate synchronous relationship between the input and output shaft speeds has been obtained such that the gearing between these shafts can now be safely and smoothly implemented. Of course after the proper gear coupling is achieved the master clutch 14 is released by the vehicle operator allowing the engine crankshaft 11 to drive the vehicle axle shaft via the transmission output shaft 15.

It should be noted that the signal e being "approximately zero" means that the error signal has a magnitude corresponding to the countershaft 27 and the transmission output shaft 15 being rotated at speeds within 75 rpm of the desired speed difference therebetween. Also it should be noted that comparator 80 preferably implements a plus or minus 75 rpm deadband for providing the release signal at terminal 22B. Thus a REF (reference) signal corresponding to 75 rpm is one input to comparator 80 and the other input is effectively the absolute value of the signal e. Of course, any equivalent circuit combination could be used for comparator 80.

The advantage of the present invention resides in the nonlinear processing of the proportional and integral terms of the control signal C, and this occurs by the utilization of the absolute value of the error signal e as a multiplier M for the first and second terms of the servo control signal C. This has been found to improve the transient response of the transmission control system of the present invention since a larger percentage of duty cycle actuation of the slip clutches 61 or 71 is provided for large magnitudes of the signal e, while this duty cycle variation is nonlinearly reduced as the magnitude of the error signal e decreases. Because of this characteristic very short transient times are obtained such that the operator of the vehicle is not aware that he was prevented from shifting into a selected gear by waiting for the countershaft 27 to be effectively synchronized with respect to the transmission output shaft 15.

While specific embodiments of the present invention have been shown and described, further modifications and improvements will occur to those skilled in the art. Certainly the improved servo control loop, which minimizes the transient time for implementing changes in shaft speed for the countershaft 27 while minimizing overshoot, can be applicable to many other types of speed shaft controls and to other control systems not involving speed shaft control. In addition, the utilization of the absolute value of the error signal, raised to any power x equal or greater than 1, as a multiplier M enables the present invention to be advantageously implemented by a microprocessor or computer wherein this is the preferred implementation of the present invention. Most, if not all, of the functions of the speed-up circuit 40 can preferably be implemented by a microprocessor. The flow chart in FIGS. 2a and 2b, in the dashed box area shown therein, illustrates the general operation of such a programmed microprocessor. Also, instead of single countershaft 27, a pair of countershafts could be used, each associated with just one of the slip clutches 61 and 71. All such modifications which retain the basic underlying principles disclosed and claimed herein are considered within the scope of the present invention.

We claim:
1. An electronic transmission control system comprising:
  input drive shaft means for providing an input drive shaft driven at an angular speed $w_1$;
  output shaft means comprising an output shaft capable of being selectively driven by said input drive shaft means at an angular speed of $w_2$;
  electronic transmission means selectively coupling said input drive shaft to said output shaft in accordance with a plurality of predetermined selectable angular speed ratios between said speeds of $w_2$ and $w_1$;
  said electronic transmission means including transmission control means for monitoring said input drive shaft speed $w_1$ and said output shaft speed $w_2$ and controlling at least one thereof, said control means implementing one of said selectable speed ratios by providing a predetermined coupling between said input drive shaft and said output shaft in response to the monitored angular speeds of said shafts having a predetermined relationship therebetween;
  said transmission control means including a servo control loop including subtraction means for receiving electrical signals related to said drive shaft speed $w_1$ and said output shaft speed $w_2$, providing an error difference signal e in response thereto and developing at least one control signal in response to said error signal e for controlling the speed of said one of said shafts so as to minimize said error signal;
  said transmission control means including means for providing at least a first term of said control signal proportional to said error signal e multiplied by a multiplier M, wherein M equals the absolute value of $e^x$, with e=said error signal e and x being at least 1.

2. An electronic transmission control system according to claim 1 wherein said transmission means includes means for selectively decoupling said input drive and output shafts during implementing changes in the ratio between $w_1$ and $w_2$.

3. An electronic transmission control system according to claim 2 wherein said transmission means includes variable gear ratio coupling means for selectively implementing predetermined gear ratio coupling between said input drive and output shafts to provide said predetermined selectable angular speed ratios.

4. An electronic tranmission control system according to claim 3 wherein said input drive shaft is selectively coupled to an engine drive shaft by a master clutch and wherein said output shaft is coupled to an axle shaft.

5. An electronic transmission control system according to claim 4 which includes at least one electronically controllable slip clutch coupled between one of said engine and axle shafts and one of said input drive and output shafts, said slip clutch selectively providing a variable speed coupling therebetween in accordance with the magnitude of said control signal.

6. An electronic transmission control system according to claim 1 wherein said transmission control means includes means for providing a second term of said control signal varying in accordance with the integral of said error signal e.

7. An electronic transmission control system according to claim 6 which includes means for multiplying said integral signal by said multiplier M to provide said second term.

8. An electronic transmission control system according to claim 7 wherein x equals 1 and wherein said means for providing said first term of said control signal includes means for providing, as said first term, the square of said error signal e having the polarity of said error signal e and multiplied by a multiplication factor K.

9. An electronic transmission control system according to claim 1 wherein x equals 1 and wherein said means for providing said first term of said control signal includes means for providing, as said first term, the square of said error signal e having the polarity of said error signal e and multiplied by a multiplication factor K.

10. A servo control system comprising:
means for receiving actual sensed and desired signals and providing a difference error signal e in response thereto;
control means for developing a control signal determined by error signal e; and
means for implementing control of said actual sensed signal in accordance with said control signal so as to minimize said error signal e;
said control means including means for providing at least a first term of said control signal proportional to said error signal e multiplied by a multiplier M, wherein M equals the absolute value of $e^x$, with e=said error signal e and x being at least 1;
wherein said control means includes means for providing a second term of said control signal varying in accordance with the integral of said error signal e, and which includes means for multiplying said integral signal by said multiplier M to provide said second term.

11. A servo control system according to claim 10 wherein x equals 1 and wherein said means for providing said first term includes means for providing, as said first term of said control signal, the square of said error signal e having the polarity of said error signal e and multiplied by a multiplication factor K.

12. A servo control system comprising:
means for receiving actual sensed and desired signals and providing a difference error signal e in response thereto;
control means for developing a control signal determined by said error signal e; and
means for implementing control of said actual sensed signal in accordance with said control signal so as to minimize said error signal e;
said control means including means for providing at least a first term of said control signal proportional to said error signal e multiplied by a multiplier M, wherein M equals the absolute value of $e^x$, with e=said error signal e and x being at least 1;
wherein x equals 1 and wherein said means for providing said first term includes means for providing, as said first term of said control signal, the square of said error signal e having the polarity of said error signal e and multiplied by a multiplication factor K.

13. A servo control system comprising:
means for receiving actual sensed and desired signals and providing a difference error signal e in response thereto;
control means for developing a control signal determined by said error signal e; and
means for implementing control of said actual sensed signal in accordance with said control signal so as to minimize said error signal e;
said control means including means for providing at least a first term of said control signal proportional to said error signal e multiplied by a multiplier M, wherein M equals the absolute value of $e^x$, with e=said error signal e and x being the same value for any polarity of the error signal e and at least 1.

* * * * *